United States Patent [19]
Rapier

[11] 3,781,190
[45] Dec. 25, 1973

[54] GAS COOLED NUCLEAR REACTORS
[75] Inventor: Allan Clarkson Rapier, Seascale, England
[73] Assignee: United Kingdom Atomic Energy Authority, London, England
[22] Filed: Mar. 10, 1972
[21] Appl. No.: 233,445

[30] Foreign Application Priority Data
Mar. 22, 1971 Great Britain..................... 7,508/71

[52] U.S. Cl....................... 176/59, 176/74, 176/77, 176/84
[51] Int. Cl. ........ G21c 5/06, G21c 5/14, G21c 3/16
[58] Field of Search .................. 176/58, 59, 74, 75, 176/76, 77, 83, 84

[56] References Cited
UNITED STATES PATENTS

| | | |
|---|---|---|
| 3,266,997 | 8/1966 | Hooper et al...................... 176/77 X |
| 2,985,575 | 5/1961 | Dennis et al....................... 176/58 X |
| 2,885,335 | 5/1959 | Moore et al. ........................... 176/77 |
| 3,151,035 | 9/1964 | Wyatt ................................... 176/58 |
| 3,167,483 | 1/1965 | Liermann............................. 176/77 |

FOREIGN PATENTS OR APPLICATIONS
806,985 1/1959 Great Britain....................... 176/59
971,930 10/1964 Great Britain....................... 176/74

Primary Examiner—Carl D. Quarforth
Assistant Examiner—Roger S. Gaither
Attorney—Roberts B. Larson et al.

[57] ABSTRACT

Nuclear reactor wherein stacks of fuel elements are supported centrally within vertical channels of a graphite moderator by annular discs disposed at each end of each fuel element. The discs have inner and outer diameters to correspond with inner and outer diameters of the fuel elements and conical seats complementary to tapers on the ends of the fuel elements. The lowermost disc is secured to the wall of the channel whilst the remainder are free to slide. The construction maintains uniform coolant flow passages through and about the fuel elements and allows for irradiation growth of the fuel elements and graphite moderator.

4 Claims, 3 Drawing Figures

GAS COOLED NUCLEAR REACTORS

This invention relates to gas cooled nuclear reactors.

BACKGROUND OF THE INVENTION

In a proposed gas cooled nuclear reactor the fuel elements are tubular and are stacked within cylindrical vertical channels defined by stacks of graphite blocks having cylindrical bores. The fuel elements comprise fissile material enclosed by inner and outer sheath and the coolant flows downwardly through the channels in two fractions; one fraction down the central passages formed by the inner sheaths of the fuel elements, the other down the continuous annular passages bounded by the fuel elements and the walls of the channels. A nuclear reactor of this kind is subject to several difficulties. If successive flow ducts bounded by the fuel elements in the blocks are not accurately aligned to form continuous passages the cross-sectional areas of the passages can vary causing substantially increased pressure drops and poor heat transfer conditions. Furthermore, the clearances caused by allowances for differential thermal expansion and manufacturing tolerances may cause vibration of the fuel elements in the channels.

SUMMARY OF THE INVENTION

According to the invention in a gas cooled nuclear reactor of the kind comprising tubular fuel elements stacked within vertical channels formed by stacked graphite blocks having cylindrical bores, the fuel elements have chamfers at each end and are centrally positioned within the bores by annular guide discs having conical seatings complementary to, and in abutment with, the chamfers of the fuel elements, the annular guide discs having inside and outside diameters equal to the inside and outside diameters of the tubular fuel elements, and each disc has lugs extending radially from its periphery to the wall of a channel, at least one disc in each channel being secured by its lugs to the wall of the channel to support surmounting fuel elements and associated rings.

In a preferred construction of nuclear reactor each graphite block houses two stacked fuel elements which are supported by a lower annular guide disc and are end guided by intermediate and upper guide discs.

The invention provides that the fuel elements are firmly positioned centrally of the channel so that in use, vibration is avoided and the inner and outer flow passages are maintained in alignment. Because the flow passages across the discs are almost equal in area to the flow passages in and about the fuel elements the cross-sectional area of the flow passages are substantially constant over their full length so that pressure drop is low and heat transfer is uniform. Furthermore because the accurate central location of the fuel elements is maintained irrespective of differential shape changes between the fuel element and channel due to nuclear irradiation, thermal expansion or adverse manufacturing tolerances, the longitudinal alignment ribs which have previously been provided on the fuel elements can be dispensed with. Thermal expansion and irradiation growth are accommodated by relative movement at the conical surface producing vertical growth.

DESCRIPTION OF THE DRAWINGS

Constructional embodiments of the invention are shown by way of example, in the accompanying drawings wherein.

DESCRIPTION OF THE PREFERRED EMBODIMENTS

Figure 1:
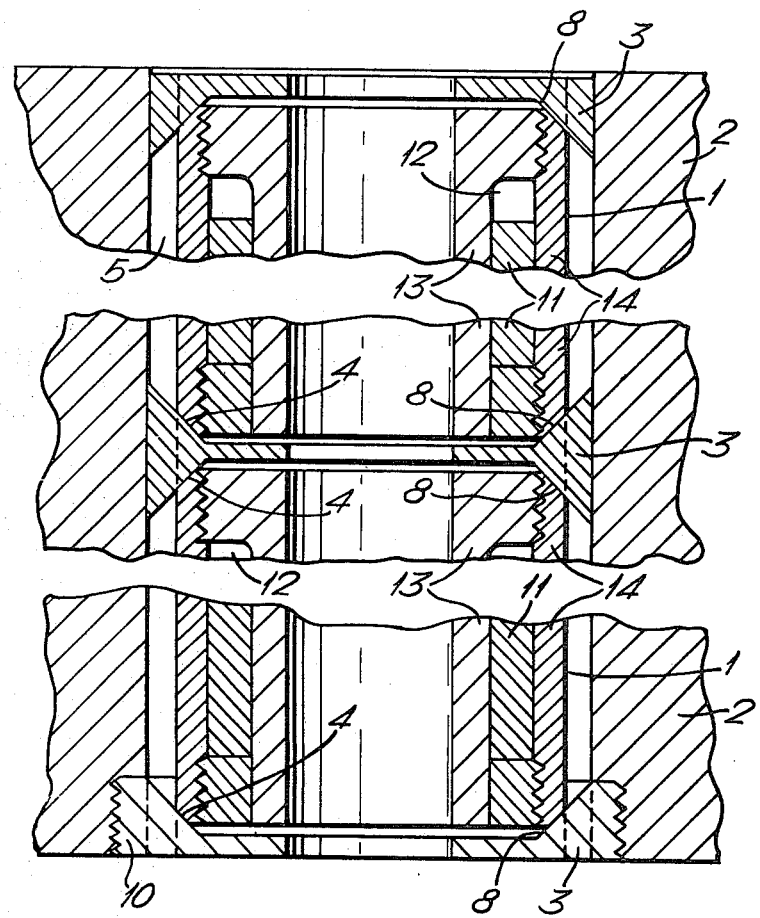
FIG. 1 is a fragmentary sectional view of two fuel elements in a graphite block.
Figure 2:
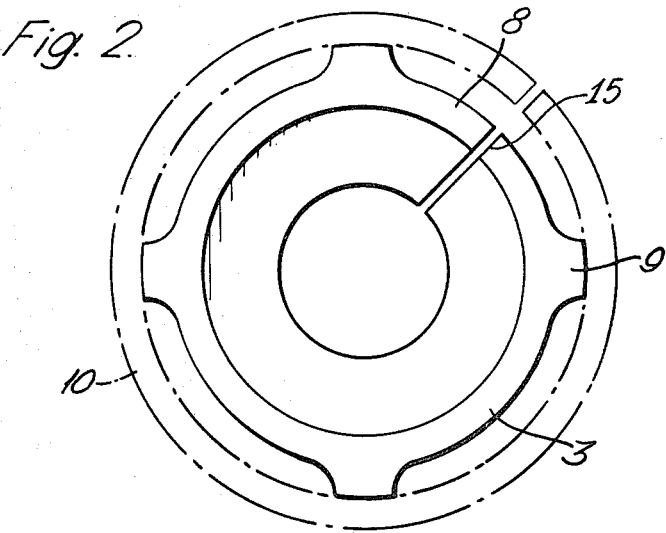
FIG. 2 is a plan view of an annular guide disc.
Figure 3:
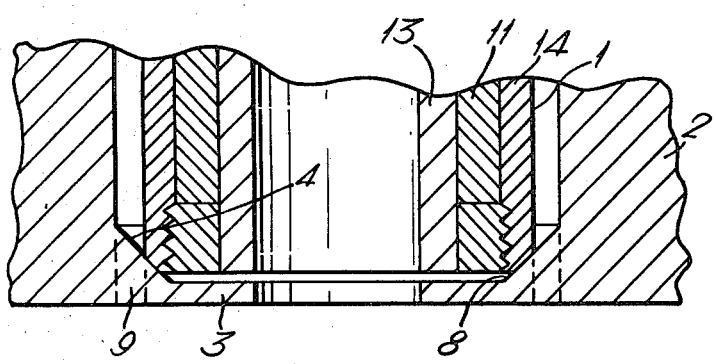
FIG. 3 is a fragmentary sectional view of an alternative construction.

In FIG. 1 two stacked fuel elements are designated 1, the graphite block 2 and annular guide discs 3. The fuel elements each comprise a stack of fuel compacts 11 (comprising coated uranium oxide particles in a graphite matrix) enclosed in an annular chamber 12 bounded by two co-axial graphite tubes 13 and 14. The fuel elements have chamfers 4 and are stacked within a bore with an annular guide disc 3 at the top and bottom of the stack and intermediate the fuel elements. The discs are made of graphite and have inside and outside diameters equal to the inside and outside diameters of the tubular fuel elements. The peripheral regions of one face of each of the upper and lower discs have conical seatings 8 complementary to the chamfers 4 of the fuel elements the intermediate disc has two such seatings. Each disc has four lugs 9 which extend to the wall of the channel 5 and in the case of the upper and intermediate discs bear slidingly against it. The lower disc is attached to the wall of channel 5 by a screwed annular surround 10 (shown in chain-line in FIG. 2) formed integrally with the lugs 9. In the described construction the conical seatings have an included angle at 90° and the discs have radial slits 15 to accommodate manufacturing tolerances and differential thermal expansion between the disc and the channel. In alternative constructions the lower disc is attached by dowelling or is formed integrally of the block by machining as shown in FIG. 3.

I claim

1. A gas cooled nuclear reactor comprising:
   a plurality of graphite blocks stacked to form a plurality of side-by-side columns, the blocks having bores defining a plurality of vertical channels,
   at least two tubular fuel elements stacked within each channel, the fuel elements having chamfers at each end,
   at least three annular guide discs within each channel for positioning the ends of the fuel elements centrally within the channel, the guide discs having conical seatings complementary to, and in abutment with, the chamfers of the fuel elements, and inside and outside diameters equal to the inside and outside diameters of the tubular fuel elements, each disc having at least three spaced lugs extending radially from its periphery to the wall of the channel, the lowermost disc of each channel being secured by its lugs to the wall of the channel to support surmounting fuel elements and associated discs.

2. A gas cooled nuclear reactor according to claim 1 wherein each graphite block houses two stacked fuel elements which are supported by a lower annular guide disc and are end guided by intermedite and upper discs.

3. A gas cooled nuclear reactor according to claim 1 wherein the supporting annular guide discs have annular surrounds formed integrally of the lugs and are secured to the walls of the channels by screw threads.

4. A gas cooled nuclear reactor according to claim 1 wherein the supporting annular guide discs are formed integrally of the blocks.

* * * * *